No. 815,406. PATENTED MAR. 20, 1906.
F. B. COOK.
AUTOMATIC ELECTRICAL SELF SOLDERING RESET FOR THERMAL PROTECTORS.
APPLICATION FILED APR. 27, 1905.
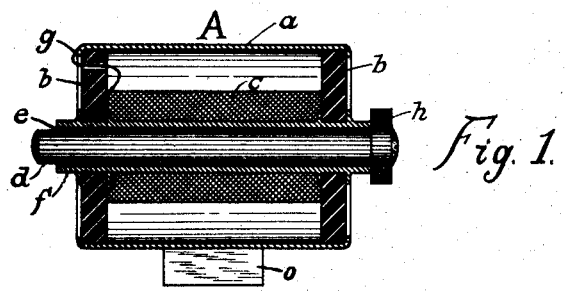
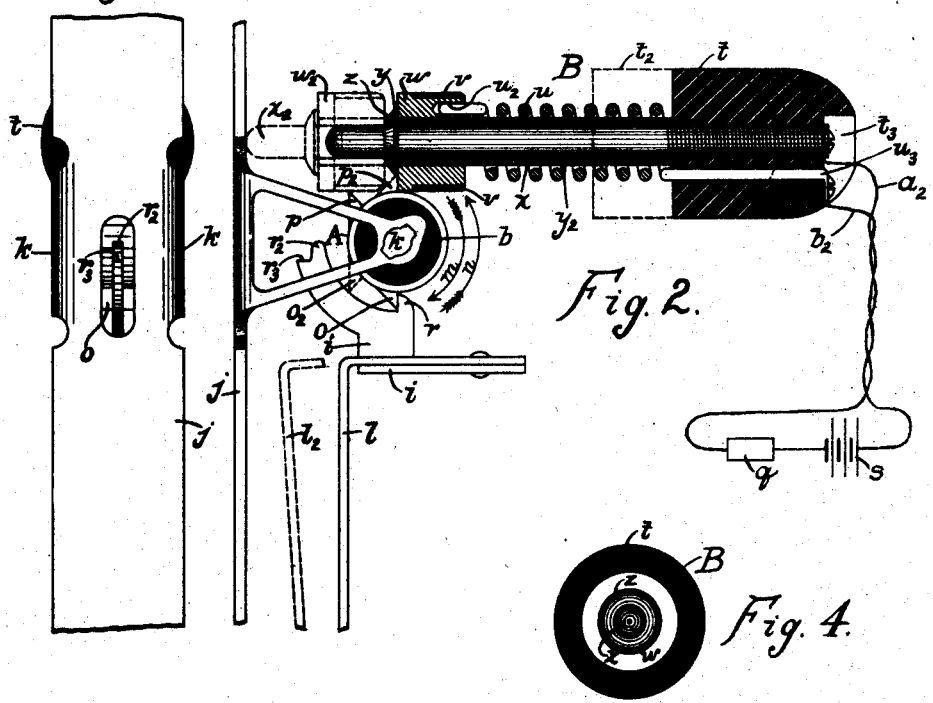
Witnesses: Frederick R. Parker, Pursell E. Feets
Inventor: Frank B. Cook.

UNITED STATES PATENT OFFICE.

FRANK B. COOK, OF CHICAGO, ILLINOIS.

AUTOMATIC ELECTRICAL SELF-SOLDERING RESET FOR THERMAL PROTECTORS.

No. 815,406.　　　　Specification of Letters Patent.　　　Patented March 20, 1906.

Application filed April 27, 1905. Serial No. 257,669.

*To all whom it may concern:*

Be it known that I, FRANK B. COOK, a citizen of the United States, residing at Chicago, in the county of Cook and State of Illinois, have invented new and useful Improvements in Automatic Electrical Self-Soldering Resets for Thermal Protectors, of which the following is a specification, reference being had to the accompanying drawings, illustrating same.

My invention relates to thermal protective devices for electrical circuits and apparatus, my object being, first, to provide such a protector and a device to coöperate therewith to automatically repair and reset the protector for another operation after it has operated without removing same from its support or handling it or its parts; second, to provide a construction in such apparatus whereby it is compulsory to test the protector before it can be again placed in the circuit as a protector; third, to provide an arrangement whereby the compulsory test may be readily and efficiently made; fourth, to provide an alarm to indicate the condition of the protector when tested and to indicate when the latter is reset, and, fifth, to provide a resetting-tool which cannot force the protector to a reset position before it is sufficiently heated or which cannot overheat the protector after same is reset.

To accomplish the purposes of this invention, I first preferably provide a heat-coil or thermal protector which when it operates turns upon an axis to a new position, where it is again fixedly secured. Then I provide a device or tool which may be brought in contact with the protector to close a circuit through same to heat it, to automatically turn the protector back to its normal operative position, to break the circuit through the protector to allow it to cool, and thereby secure itself in this normal operative position, and to hold the protector in this position until it cools. I wish it to be understood, however, that a rotary heat-coil is not essential to the invention, as the principles herein involved may be applied to other forms of protectors; also, that the construction herein shown and described is not the only arrangement by which the principles of this invention can be carried out. I have simply illustrated one way of accomplishing the desired results.

I preferably employ a soldered connection in the protector which unsolders to allow the protector to operate and then resolders the parts of the protector in a new relative position. The tool which I employ with this type of protector automatically unsolders the soldered joint and moves the parts back to their normal relative position, where they are again resoldered. This feature of unsoldering the soldered connection to reset the protector to operative position is a feature of this invention which I claim broadly. If the protector unsolders and resets properly, it shows that it is in proper condition to be used again in the circuit. If it does not properly unsolder and reset, it shows that the heat-producing means is either open or short-circuited or that the protector is damaged in some way. In case the protector is damaged in any way it can be readily replaced by a new one. Thus it will be seen that the circuit to be protected is always supplied with a protector which is in good operative condition.

The alarm or indicator may be adapted to indicate whether the current is properly closed through the protector when same is to be reset and when the current is cut off from the protector after it is reset.

I will more particularly describe my invention by reference to the accompanying drawings, in which—

Figure 1 is a longitudinal cross-sectional view of the heat-coil preferably used. Fig. 2 is an end view of the heat-coil in connection with its supporting and operating springs and a longitudinal cross-sectional view of the resetting-tool, with the battery circuit, with portions of the tool shown in elevation, the tool being shown in the position ready to be used to reset the heat-coil to operative position. Fig. 3 is a view of Fig. 2 taken from the left thereof, the handle of the resetting-tool being shown in elevation; and Fig. 4 is an end view of the resetting-tool of Fig. 2.

Like characters refer to like parts in the several figures.

The heat-coil A herein shown is a modification of the heat-coil which forms the subject-matter of my application for patent on self-soldering heat-coil, Serial No. 255,444, filed April 13, 1905.

In the heat-coil A the pin $d$ is secured within the tube $f$ by an easily-fusible solder $e$. Insulating-washers $b$ $b$ are rigidly secured upon tube $f$. Shell $a$ is carried by washers $b$ $b$ and is rigidly secured thereto. Heat-producing winding $c$ is wound upon tube $f$ between washers $b$ $b$ and is in circuit with pin $d$ and shell $a$. When the heat-coil is set to operative position, the pin $d$ is inserted between ears $k$ $k$ of spring $j$, the flattened end $h$ of pin $d$ fitting into an indenture in one ear $k$ to hold the pin $d$ in a fixed position. On the shell $a$ I preferably provide two teeth $o$ and $p$, respectively. The point $r$ on spring $i'$ engages tooth $o$ when the apparatus is in a set position and tends to turn the heat-coil in the direction of arrow $m$.

The circuit through the apparatus is from spring $j$, through ears $k$ $k$, pin $d$, tube $f$, winding $c$, shell $a$, tooth $o$, point $r$, and spring $i'$. When an abnormally large current traverses the winding $c$ of the heat-coil for a sufficient length of time, (depending upon the strength of the current,) it softens the heat-susceptible material $e$ and thereby allows spring $i'$ to turn the heat-coil upon the pin $d$ until the tooth $o$ takes the position $o^2$ and the tooth $p$ takes the position $p^2$ and spring $i'$ releases itself from tooth $o$ and takes the position $l^2$. The circuit through the heat-coil is now open, and as soon as the solder $e$ cools and hardens it resolders the tube $f$ to the pin $d$ in this new relative position.

The resetting-tool B is preferably constructed as follows: A pin $x$, provided with an annular shoulder $z$, extends through an insulating-sleeve $y^2$. A plunger $w$ is loosely placed upon the insulating-sleeve $y^2$ and is provided with an insulating-covering $v$ over a part of its external surface. An insulating-washer $y$ is placed on pin $x$ between shoulder $z$ and plunger $w$ to insulate the latter from pin $x$. A coil-spring $u$ is loosely placed upon the sleeve $y^2$ and is conductively and securely connected with the plunger $w$ at $u^2$. One end of spring $u$ is extended through a hole in the insulating-handle portion $t$, which latter is preferably screwed upon the pin $x$ against the sleeve $y^2$. Conductors $a^2$ and $b^2$ are connected to pin $x$ and spring $u$, respectively, the handle $t$ being cut away at $t^3$ to facilitate such connections. Battery $s$, preferably a few dry cells, and apparatus $q$ are connected in circuit with conductors $a^2$ and $b^2$. $q$ may be a resistance-coil, a rheostat, a switch, an ammeter, an alarm, or any desirable instrument for controlling or indicating the current from battery $s$. The circuit through the resetting-tool is from pin $x$, through conductor $a^2$, battery $s$, instrument $q$, conductor $b^2$, and spring $u$ to plunger $w$.

To reset the heat-coil to operative position, the plunger $w$ is first placed against tooth $p$ of the heat-coil in the position $p^2$. Then by means of the handle $t$ the pin $x$ is pushed to the position $x^2$ against spring $j$, the handle $t$ taking the position $t^2$ and the plunger $w$ remaining in the same relative position to the heat-coil as when first engaged therewith. This operation of the resetting-tool B compresses the coil-spring $u$, thus putting the plunger $w$ under a tension against tooth $p$ in the position $p^2$ and closes the circuit of battery $s$ through winding $c$ of the heat-coil to soften the solder $e$. The circuit thus closed is from battery $s$ through conductor $a^2$, pin $x$, spring $j$, ears $k$ $k$, pin $d$, tube $f$, winding $c$, shell $a$, tooth $p$, plunger $w$, spring $u$, conductor $b^2$ and instrument $q$ to battery $s$. When the current from battery $s$ has traversed winding $c$ for a short length of time— say from two to ten seconds, depending upon the strength of the current used—the heat generated in winding $c$ softens the heat-susceptible material $e$, and thereby allows the heat-coil to turn upon pin $d$. The plunger $w$, being under spring tension, now turns the heat-coil in the direction of arrow $n$ on the pin $d$ until the teeth $o$ and $p$ take their normal positions relatively to spring $j$, (indicated by the letters $o$ and $p$, respectively,) the plunger $w$ at the same time taking the position $w^2$. When the heat-coil is turned back far enough, the plunger $w$ slips over the tooth $p$ until the latter rests on the insulating-ring $v$, which breaks the circuit of battery $s$ through the heat-coil. The heat-susceptible material $e$ now cools and hardens, and thereby resolders the heat-coil to the pin $d$ in its original operative position. The point $r$ of spring $i'$ may now be reëngaged with the tooth $o$ as originally to set the apparatus for another operation. This cycle of operations comprising the operation and resetting of the heat-coil and apparatus may be repeated as many times as desired. In resetting the heat-coil to operative position the plunger $w$ rests against the body of the heat-coil, and thus prevents the latter from turning too far when the coil-spring $u$ throws the heat-coil back to operative position.

If the protector A can be properly reset to operative position, it shows that the heat-producing means is in proper condition to heat the heat-susceptible material and that the soldered joint is in proper condition to operate. If the heat-producing winding $c$ is open or short-circuited, it will not heat the heat-susceptible material $e$, and consequently the protector cannot be reset. If the protector can be reset, it shows that it will again operate. Therefore the efficiency of the protector is always tested when same is reset for another operation, and if it is found to be defective or damaged it may be replaced by a new one. With the arrangement of this invention it is compulsory to test the heat-coil before it can be used again.

With this form of resetting-tool the heat-coil cannot be turned back to operative position before the solder is sufficiently softened, as spring $u$ is comparatively weak, so as not to break the solder before it is heated sufficiently to resolder the parts together after they have been reset. Therefore the heat-coil cannot be strained or damaged by the use of this tool. As the resetting-tool automatically shuts off the current through the heat-coil as soon as the latter is reset, the heat-coil cannot be burned out or overheated if the tool is held against the heat-coil too long.

I do not wish to limit this invention to the minor details of construction as shown in the drawings, as many modifications may be made in the construction without departing from the scope of the invention.

Having thus described my invention, what I claim as new, and desire to secure by Letters Patent, is—

1. In apparatus of the class specified, a thermal protector normally held against operation by heat-susceptible material, means for operating the protector when the heat-susceptible material is softened, and means for supplying the protector with current for resoftening the heat-susceptible material and resetting the parts of the protector to their normal position for another operation.

2. In apparatus of the class specified, parts held together by a solder-joint, means for producing relative movement of the parts when the device operates, and means for supplying the device with current to unsolder the joint and set the parts back to their normal relative position for another operation.

3. An electrical controller comprising thermally-operable securing means releasable on a change in electrical-circuit conditions, and means whereby the device is automatically reset from an inoperative to an operative position preparatory for another operation, on a second change in electrical-circuit conditions.

4. A thermal protector, means for disarranging the parts thereof upon abnormal electrical conditions therein, means for supplying current to the device, and means for rearranging the said parts for another operation when the heating effect of the said current is sufficient.

5. A thermal protector the parts of which have been disarranged by the operation of the device, and means for supplying current for heating the protector and rearranging the parts for another operation.

6. An electrical-circuit protector comprising solder-controlled devices for protecting the circuit on the passage of an unduly strong current, means for supplying current for reheating the device to reset same for another operation, and means for rearranging the parts for resoldering.

7. A thermal protector the parts of which have been disarranged by the operation of the device, mechanical means for rearranging the parts for another operation, and means for supplying current to permit of the rearranging.

8. A device operable upon abnormal current conditions, electrical means for heating the device for resetting and means for resetting the device for operation.

9. A device operable upon abnormal current conditions, and means adapted to apply current thereto for heating the device and to reset same for another operation.

10. An electrical-circuit protector comprising movable parts, a solder-joint normally securing the said parts in position, thermal means for releasing the solder-joint, means for moving the movable parts, means for supplying current for re-releasing the solder-joint after operation, and means for resetting the parts to operative position where they are automatically resoldered.

11. An electrically-operable device comprising a solder-joint, means for unsoldering the latter after it has cooled after operation, and means for rearranging the parts for another operation, in which position they are secured by the cooling of the solder.

12. An electrical-circuit protector comprising means operable upon an excess of current, means for supplying heat to the device after operation, and means for resetting the device for another operation when thus heated.

13. An electrothermal device of the character described, a solder-joint in the device, means for operating the device when the solder is softened, the cooling of the solder-joint placing the device in an inoperative condition, means for now supplying current for softening the solder, and means for resetting the device to operative position while the solder is softened, in which position it is held by the cooling of the latter.

14. An electrothermal device operable upon abnormal current conditions, and electromechanical means for reheating the device and resetting same from an inoperative to an operative position.

15. A thermally-operable electric-circuit controller, and means coöperating therewith for re-releasing and resetting in reset operative position a portion thereof released upon operation.

16. A device operable upon abnormal current conditions, and means coöperating therewith to apply current thereto after operation for heating the device, and to reset same for another operation when heated.

17. A thermal protector comprising a stationary axis and a rotary portion held to the axis by heat-susceptible material and carrying heat-producing means; in combination with an electrical resetting-tool therefor comprising a spindle, a sleeve of insulation placed upon the spindle, a coil-spring encircling the said sleeve, and a plunger carried by the said sleeve and adapted to be actuated by the said spring.

18. An electrical-circuit protector comprising a solder-joint, and an electromechanical device coöperating therewith after operation to re-release and reset to operative position parts released upon operation.

19. A thermal protector comprising a stationary axis, a rotary portion held to the axis by heat-susceptible material, heat-producing means carried by the rotary portion, and engaging devices on the rotary portion; in combination with a resetting-tool for the protector, comprising a spindle, a coil-spring and plunger carried by the spindle and insulated therefrom, the said spring being arranged to actuate the plunger, and a handle portion; the said tool being adapted to engage a said engaging device and close a circuit through the protector to soften the heat-susceptible material, and to reset the protector to operative position, substantially as described.

20. In an electrical-circuit protector, the combination of cementing material, means for softening said material on the passage of an unduly strong current, a movable part normally held against movement by said cementing material, means for moving said part when same is released by the passage of an unduly strong current, means for applying current for resoftening the cementing material after same has hardened after operation, and means for moving said movable part into position for another operation where it is automatically recemented by the cooling of the cementing material.

21. A rotary heat-cartridge, means for operating same, and a tool for closing a circuit of a source of electricity through the protector to heat same, and for resetting the protector for another operation when thus heated.

22. A heat-cartridge comprising a rotary detent, heat-susceptible material normally holding the detent from operating, heat-producing means for softening the heat-susceptible material, means to engage the detent to operate same when the heat-susceptible material is softened, the cooling of the latter after operation securing the detent in a new position, means to engage the detent to reset same to operative position when the heat-susceptible material is again softened, means for closing a resetting-current through the device to soften the heat-susceptible material, means for automatically opening the circuit through the device after the detent has been reset, and means for holding the detent in the proper position while the heat-susceptible material cools.

23. An electrical-circuit protector comprising an operable portion and a solder-joint normally holding the operable portion against operation, in combination with a tool adapted to be applied thereto after operation to close a circuit through the protector to reheat same and automatically reset same to operative position where it is secured by the solder-joint becoming cool.

24. The combination with a thermal protector of the class specified, of a resetting-tool comprising means for closing a circuit through the protector and spring means for automatically resetting the protector after the said circuit has been closed a sufficient length of time.

25. In apparatus of the class specified, the combination of heat-producing means, a rotary detent normally held against rotation by heat-susceptible material, circuit-controlling means adapted to turn the rotary detent when the heat-susceptible material is softened, means to be applied to the rotary detent after operation to apply current thereto to resoften the heat-susceptible material, and means to automatically turn the rotary detent back to normal position.

26. A tool for resetting thermal protectors of the character described, comprising mechanism to be applied to the protector to close a circuit through same for heating, spring means for automatically resetting the protector after same is heated, and means for opening the said circuit after the protector is reset.

27. A tool for resetting thermal protectors of the character described, comprising mechanism to be applied to the protector to close a circuit through same for heating, spring means for automatically resetting the protector after same is heated, and means for opening the said circuit after the protector is reset, the tool being constructed to hold the protector in reset position while cooling.

28. The combination of an electrical circuit protector operable upon abnormal current conditions, and a resetting-tool for the protector, to be applied thereto after operation, comprising means for closing an electric circuit through the protector to heat same, and means for reversely operating the protector to reset same for a subsequent operation.

29. The combination of an electrical-circuit protector operable upon abnormal current conditions, and a resetting-tool for the protector, to be applied thereto after operation, comprising means for closing an electric circuit through the protector to heat same, and spring-controlled means for resetting the protector for another operation.

30. The combination of a thermal protector operable under abnormal current conditions, and a device to be applied thereto after operation to test the protector and in testing it to reset same for another operation.

31. A resetting-tool for thermal protectors, comprising a metallic spindle with a shoulder thereon, an insulating-sleeve carried by the spindle, a metallic plunger loosely placed upon the said sleeve and insulated from the said spindle, an insulating-ring covering a portion of the external surface of the plunger, a coil-spring encircling the insulating-sleeve and attached to the metallic plunger, an insulating-handle secured to one end of the spindle and forming a bearing for the coil-spring and a source of electricity and an electrical instrument in circuit with the spindle, coil-spring and plunger.

32. A rotary heat-cartridge provided with engaging devices and normally secured in operative position by heat-susceptible material, spring means for supporting the protector, spring means for engaging an engaging device to operate the protector under abnormal current conditions, a tool provided with a spring-actuated member adapted to engage an engaging device to reset the heat-cartridge to operative position when the heat-susceptible material is softened, a spindle adapted to be moved into contact with the first-mentioned spring, means to close a circuit through the heat-cartridge to heat same for resetting, the said movement of the spindle placing the said spring-actuated member under stress of its actuating-spring, a source of electricity in circuit with the said spindle and spring-actuated member, and a suitable handle for the tool, the latter, when used to reset the heat-cartridge, first having its spring-actuated member engaged with an engaging device of the cartridge, then having its spring-actuated member placed under tension of its actuating-spring and thereby closing the resetting-current through the cartridge, then resetting the heat-cartridge to operative position when the heat-susceptible material is sufficiently softened, then breaking the circuit through the cartridge to allow the heat-susceptible material to cool, and holding the cartridge in position while cooling.

33. The combination of a rotary heat-cartridge operable under abnormal current conditions, and a device to be applied thereto after operation to test the protector and in testing it to reset same for another operation.

34. The combination of a thermal protector operable under abnormal current conditions, and an electromechanical device to be applied thereto after operation to test the electrical condition of the protector and in testing it to reset same for another operation.

35. The combination of a thermal protector of the class specified, and a tool to be applied thereto after operation to ascertain the condition of same and simultaneously reset same for another operation, the said tool comprising means for closing a circuit through the protector to heat same, and spring means for resetting the protector when heated.

36. An electrothermal device of the character described, normally held against operation by heat-susceptible material, and means to be applied thereto after operation to reversely operate same and thereby reset same for another operation.

37. An electrothermal device of the character described, normally held against operation by heat-susceptible material, and means for operating same after it has cooled after operation, to reset same for another operation.

38. Electrical protective apparatus operable under abnormal electrical conditions, means for supplying heat thereto after operation to condition same for resetting, and means for resetting the apparatus for another operation when thus heated.

39. Electrical protective apparatus operable under abnormal electrical conditions therein, a solder-joint in the apparatus normally holding same against operation, means for applying heat to the solder after the apparatus has operated to prepare the solder to resecure the apparatus in operative position, and means for resetting the apparatus for another operation while the solder is in condition to secure same in such operative position.

40. Electrical protective apparatus operable under abnormal electrical conditions therein, a solder-joint in the apparatus normally holding same against operation, and means for applying electricity to the apparatus after operation to cause same to heat the solder and soften same, if in good condition, as a test on the apparatus.

As inventor of the foregoing I hereunto subscribe my name, in the presence of two subscribing witnesses, this 24th day of April, 1905.

FRANK B. COOK.

Witnesses:
FREDERICK R. PARKER,
JNO. F. TOMPKINS.